United States Patent [19]

Crouch

[11] Patent Number: 6,019,176

[45] Date of Patent: Feb. 1, 2000

[54] FIRE SUPPRESSANTS AND METHODS OF MANUFACTURE AND USE THEREOF

[75] Inventor: Robert L. Crouch, Phoenix, Ariz.

[73] Assignee: Fire-Trol Holdings, L.L.C., Phoenix, Ariz.

[21] Appl. No.: 08/931,907

[22] Filed: Jun. 3, 1997

[51] Int. Cl.$^7$ ...................................................... A62D 1/00
[52] U.S. Cl. ............................................. 169/46; 252/607
[58] Field of Search .................................. 169/43, 44, 45, 169/46, 49, 53, 54; 244/136; 252/603, 607; 106/18.11

[56] References Cited

U.S. PATENT DOCUMENTS

| 3,730,890 | 5/1973 | Nelson | ........................................ 252/7 |
| 3,930,832 | 1/1976 | Sansing . | |
| 4,356,021 | 10/1982 | Kenton . | |
| 4,556,536 | 12/1985 | Novotny . | |
| 4,600,558 | 7/1986 | Novotny . | |
| 4,983,326 | 1/1991 | Vandersall | ............................. 169/45 X |
| 5,582,871 | 12/1996 | Silenius et al. | ..................... 252/607 X |

OTHER PUBLICATIONS

Silenius et al, "Method for Preserving Wood Against Undesirable Reactions Caused by Microorganisms", PCT Publication WO 94/22647, Dec. 13, 1994.

*Primary Examiner*—Andres Kashnikow
*Assistant Examiner*—Sean P. O'Hanlon
*Attorney, Agent, or Firm*—Drummond & Duckworth

[57] ABSTRACT

This invention relates to fire suppressant compositions and methods of preparing and using such compositions. The compositions consist of water, at least about 5% by weight of a fire retardant salt, which includes at least 1.5% by weight of ammonium thiosulfate. These compositions may contain other optional functional components such as corrosion inhibitors, suspending agents, coloring agents, antimicrobials and stabilizers.

3 Claims, No Drawings

FIRE SUPPRESSANTS AND METHODS OF MANUFACTURE AND USE THEREOF

This invention relates to chemical fire suppressant compositions.

In another respect, the invention pertains to methods of manufacture of such compositions.

In still another respect, the invention concerns methods of using such compositions for extinguishing and/or retarding the spread of wildfires.

In a further aspect, the invention relates to chemical concentrates adapted for dilution with water to produce long term fire suppressant.

In still other respects, the invention concerns compositions and methods of production in which various components such as corrosion inhibitors, rheological modifying agents, suspending agents, antimicrobials, stabilizers and coloring agents are maintained in suspension in the concentrate liquid and, upon dilution, produces the fire suppressant composition.

Suppressing wildland fires generally involves applying a liquid or foam fire suppressant from a helicopter, fixed-wing aircraft or ground vehicle to timber or other wildland foliage to either form a chemical fire break in front of an oncoming fire, or applying the suppressant directly to the burning foliage itself to extinguish the fire.

Chemical compositions employed as fire suppressants in such fire control methods ordinarily comprise aqueous mixtures containing between 5% and 20% by weight of a fire retardant, a liquid carrier, and optionally, various functional additives which improve specific characteristics of the composition. These functional additives may include, e.g., rheological modifying agents (to improve the aerial drop and coverage characteristics), corrosion inhibitors (to reduce the corrosivity of the compositions to metal components of storage and application equipment), coloring agents (to improve the accuracy and coverage of successive aerial applications), stabilizing agents (to prevent separation of the various components of the composition during storage and transport), anti-microbial agents (to prevent microbial decomposition of certain components), etc.

Generally, the fire retardant component of the fire suppressant composition is a salt that produces phosphoric acid or sulphuric acid when heated. Common retardants are ammonium phosphate compositions and ammonium sulfate compositions such as monoammonium orthophosphate, diammonium orthophosphate, monoammonium pyrophosphate, diammonium pyrophosphate, triammonium pyrophosphate, tetrammonium pyrophosphate, ammonium polyphosphate, substituted ammonium polyphosphate, amide polyphosphate, melamine polyphosphate, ammonium-alkali metal mixed salts of orthophosphate, ammonium-alkali metal mixed salts of pyrophosphate, ammonium-alkali metal mixed salts of polyphosphate, ammonium-alkaline earth metal mixed salts of orthophosphate, ammoniun-alkaline earth metal mixed salts of pyrophosphate, ammonium-alkaline earth metal mixed salts of polyphosphate, ammonium sulfate and blends thereof. These and other fire retardant mixtures are discussed in U.S. Pat. No. 3,196,108 (Nelson); U.S. Pat. No. 3,730,890 (Nelson); U.S. Pat. No. 3,960,735 (Lacey); U.S. Pat. No. 4,168,239 (Mertz); U.S. Pat. No. 4,176,071 (Crouch); U.S. Pat. No. 3,634,234 (Morgenthaler); U.S. Pat. No. 3,257,316 (Langguth); U.S. Pat. No. 4,822,524 (Strickland); U.S. Pat. No. 4,447,336 (Vandersall); and U.S. Pat. No. 4,839,065 (Vandersall).

When such fire suppressants are used to extinguish or retard the spread of a wildland fire, the retardant and the wildland foliage coated by the retardant are heated by flames. It is believed that as the ammonium phosphate or ammonium sulfate retardant is heated, ammonia is released, leaving phosphoric acid or sulfuric acid on the wildland foliage. It is thought that during this reaction that, as a byproduct, water is given off as fire suppressing steam. Thus, typical fire retardants are salts that release phosphoric acid or sulfuric acid below the ignition temperature of the cellulose of the wildland foliage.

Fire retardant compositions of the prior art are corrosive to the metal parts of storage, mixing and application. For example, ammonium phosphates and related fire retardants are highly corrosive to aluminum, a principal structural component of aircraft vehicles used to aerially apply such suppressants. Other known fire retardants are corrosive to steel and brass parts of storage and handling equipment for mixing and loading the fire suppressant compositions aboard application vehicles. Accordingly, fire suppressant mixtures typically include a corrosion inhibitor. Commonly used corrosion inhibitors include 2,5 dimercaptothiadiazole (DMTD), sodium hexacyanoferrate (II), sodium silicofluoride, sodium dichromate, chromic acid and sodium thiosulfate. Some of these corrosion inhibitors are toxic. Some may impart undesirable color to the fire suppressants and, in any event, the use of relatively large amounts are of corrosion inhibitors is expensive and may complicate the manufacture of fire suppressants. For these and other reasons, it would be desirable to provide improved fire suppressants, that include fire retardants which are less corrosive, such that much smaller amounts of corrosion inhibitors can be used, leading to less complicated manufacture, less undesirable color, less expense and lessened chance of environmental damage.

I have now discovered that the salts of thiosulfuric acid which decompose at flame temperature are effective to suppress wildland fires. Further, salts of thiosulfuric acid are less corrosive to storage and application equipment than the ammonium phosphate and ammonium sulphate fire retardants of the prior art. This discovery enables one to provide fire suppressant compositions without the addition of a corrosion inhibitor, or in the alternative, enables one to employ smaller amounts of corrosion inhibitors or to employ a corrosion inhibitor other than sodium hexacyanoferrate (II) which is currently used in connection with fire suppressants based on ammonium polyphosphate, but which imparts an undesirable deep blue color to fire suppressant compositions.

Briefly, in accordance with my invention, I provide a concentrate for the preparation of a fire suppressant composition especially adapted for ground and aerial application. The concentrate consists essentially of water and a salt of thiosulfiric acid which decomposes at flame temperature in an amount effective to suppress wildland fires. More particularly, the only salt of thiosulfuric acid that I have discovered which decomposes at flame temperature is ammonium thiosulfate. Other salts of thiosulfiric acid such as sodium thiosulfate or calcium thiosulfate do not decompose at flame temperature, and accordingly, are not effective to suppress wildland fires. Accordingly, the preferred fire retardant of my invention consists essentially of ammonium thiosulfate.

Ammonium thiosulfate is presently available in liquid form under the trade name "THIO-SUL®" by the company Tessenderlo Kerley, Inc. and consists of approximately 55–60% ammonium thiosulfate and 36–45% water.

In accordance with a further embodiment of my invention, I provide a process for preparing a fire suppressant composition especially adapted for aerial application, the process comprising the steps of forming a concentrate which consists essentially of ammonium thiosulfate and water, and thereafter mixing the concentrate with additional water in an amount to produce a viscous fire suppressant composition containing sufficient ammonium thiosulfate to suppress wildland fires.

In preparing the concentrate, the ammonium thiosulfate is mixed with other desired components such as corrosion inhibitors, suspending agents, stabilizers, antimicrobials, rheological modifying agents and coloring agents. The mixing of the components of the concentrate may be accomplished with low shear mixers. However, if attapulgite clay is used as a suspending agent, the mixing of the components of the concentrate is preferably accomplished by high shear action such as may be afforded by a Waring Blender or by impellers of high speed recirculating pumps or by bladed high speed discs.

Examples of corrosion inhibitors which may be effectively employed in the practice of my invention are ortho-phosphate salts, aromatic triazole compounds and salts thereof, sodium benzoate, benzoic acid, cinnamic acid, sorbic acid, 2-mercaptobenzothiazole (MBT), 2,5-dimercaptothiadiazole (DMTD), sodium silicofluoride and diammonium ortho-phosphate (DAP). It is believed that the preferred corrosion inhibitors are sodium benzoate, benzotriazole, MBT and DAP.

Rheological modifying agents may also be effectively employed in the fire suppressant compositions and concentrates of my invention. Rheological modifying agents are components which alter the flow properties, including altering the viscosity, surface tension, yield stress, and elasticity, of the fire suppressant or concentrate. Rheological modifying agents include thickeners and flow conditioners. Some typical thickeners and flow conditioners are discussed in U.S. Pat. No. 3,634,234 (Morgenthaler), U.S. Pat. No. 4,447,336 (Vandersall), U.S. Pat. No. 4,447,337 (Adl et al.) and U.S. Pat. No. 4,983,326 (Vandersall). It is believed that the preferred rheological modifying agents of the present invention are guar gum, derivatized guar gum and foam.

The preferred antimicrobial agents are believed to be methyl paraben and propyl paraben.

After forming the liquid concentrate which consists of ammonium thiosulfate, water and any desire components such as corrosion inhibitors, suspending agents, coloring agents, antimicrobial, and stabilizers, the concentrate can be stored for extended periods without appreciable separation of the components. Since all of the components of the final fire suppressant composition, except additional water for dilution, are present in the concentrate, transportation of the materials from the manufacturing facility to the application equipment loading site is facilitated. The concentrate may then be stored at the loading site until needed and then finally diluted as desired with water to produce the final fire suppressant composition just before the composition is loaded into the equipment for application at the fire site.

The amount of water of dilution employed to convert the concentrate to the final fire suppressant composition will vary widely depending upon the exact composition of the concentrate and the desired viscosity of the final composition. The desired viscosity will, in turn, depend on the type of vegetation to which the composition is ultimately to be applied, the expected drop altitude, wind conditions, etc. Any number of techniques may be used to dilute the concentrate for use as a fire control suppressant. For example, the concentrate may be diluted in a holding tank. Alternately, the concentrate and water may be introduced from separate feed lines into a common conduit wherein the mixing takes place. The resulting fire suppressant solution may be discharged directly from the mixing conduit into the delivery tank of the delivery vehicle.

The following examples illustrate the practice of the invention, but are not intended as limitations on the scope thereof. In each example, the indicated components of the fire suppressant formulation are mechanically mixed by any of several mixing techniques well known in the art to provide the indicated final compositions.

EXAMPLE 1

This example illustrates a liquid concentrate of the present invention which is to be diluted approximately 4:1 (water:concentrate) by weight to produce a wildland fire suppressant composition. Liquid guar gum concentrate may be added as needed for enhanced rheological properties. Further, liquid color agents may be added to enhance conspicuity.

| Component | wt. % |
|---|---|
| Ammonium thiosulfate | 59.999–50.00 |
| Water | 40.00–45.00 |
| Corrosion inhibitor(s) | 0.001–5.00 |
| | 100.00 |

EXAMPLE 2

This example illustrates a liquid concentrate of the present invention which is to be diluted approximately 4:1 (water:concentrate) by weight to produce a wildland fire suppressant composition.

| Component | wt. % |
|---|---|
| Ammonium thiosulfate | 59.999–36.00 |
| Water | 40.00–45.00 |
| Corrosion inhibitor(s) | 0.001–5.00 |
| Suspending agent(s) | 0.000–5.00 |
| Stabilizer(s) | 0.000–5.00 |
| Antimicrobial(s) | 0.000–2.00 |
| Colorant(s) | 0.000–2.00 |
| | 100.00 |

EXAMPLE 3

This example illustrates a liquid concentrate of the present invention to be diluted approximately 4:1 (water-concentrate) by weight to produce a wildland fire suppressant composition. Liquid coloring agents, either fugitive pigment or red iron oxide, may be added to enhance conspicuity.

| Component | wt. % |
|---|---|
| Ammonium thiosulfate | 59.999–38.00 |
| Water | 40.00–45.00 |
| Corrosion inhibitor(s) | 0.001–5.00 |
| Suspending agent(s) | 0.000–5.00 |
| Stabilizer(s) | 0.000–5.00 |
| Antimicrobial(s) | 0.000–2.00 |
| | 100.00 |

EXAMPLE 4

This example illustrates a diluted wildland fire suppressant composition of the present invention, including ammonium thiosulfate in an amount effective to retard wildland fires, optimized for synergistic effects with other chemical retardants such as diammonium orth-phosphate (DAP) and monoammonium ortho-phosphate (MAP).

| Component | wt. % |
|---|---|
| Ammonium thiosulfate | 1.50–30.00 |
| DAP or MAP | 1.000–5.000 |
| Corrosion inhibitor(s) | 0.000–2.000 |
| Suspending/Rheological modifying agent(s) | 0.000–2.000 |
| Stabilizer(s) | 0.000–1.000 |
| Antimicrobial(s) | 0.000–1.000 |
| Colorant(s) | 0.000–1.000 |
| Water | balance |
| | 100.00 |

EXAMPLE 5

This example illustrates a liquid concentrate of the present invention which is to be diluted approximately 4:1 (water:concentrate) by weight to produce a wildland fire suppressant composition.

| Component | wt. % |
|---|---|
| Ammonium thiosulfate | 56.04 |
| Water | 37.36 |
| Sodium benzoate | 1.000 |
| Benzotriazole | 0.400 |
| 2-mercaptobenzothiazole | 0.400 |
| Attapulgite Clay | 4.000 |
| Fading Pigment | 0.500 |
| Titanium dioxide | 0.300 |
| | 100.00 |

EXAMPLE 6

This example illustrates a liquid concentrate of the present invention which is to be diluted approximately 4:1 (water:concentrate) by weight to produce a wildland fire suppressant composition. Liquid guar gum concentrate may be added in variable amounts to the diluted mixture as needed for enhanced rheological properties. Liquid color concentrate, either fugitive pigment or red iron oxide, may also be added in variable amounts to the diluted mixture to enhance conspicuity.

| Component | wt. % |
|---|---|
| Ammonium thiosulfate | 58.92 |
| Water | 39.28 |
| Benzotriazole | 0.400 |
| 2-mercaptothiadiazole | 0.400 |
| Sodium benzoate | 1.000 |
| | 100.00 |

EXAMPLE 7

This example illustrates a diluted wildland fire suppressant composition of the present invention, including ammonium thiosulfate, optimized for synergistic effects by including additional chemical retardants such as diammonium ortho-phosphate (DAP).

| Component | wt. % |
|---|---|
| Ammonium thiosulfate | 9.84 |
| DAP | 2.28 |
| Sodium benzoate | 1.000 |
| Benzotriazole | 0.400 |
| 2-mercaptobenzothiazole | 0.400 |
| Attapulgite Clay | 4.000 |
| Fading Pigment | 0.500 |
| Titanium dioxide | 0.300 |
| Water | balance |
| | 100.00 |

EXAMPLE 8

This example illustrates a liquid concentrate of the present invention to be diluted approximately 4:1 (water:concentrate) by weight to form a fire suppressant composition. Liquid color concentrate, either fugitive pigment or red iron oxide, may be added to the diluted mixture in a variable amount to enhance conspicuity.

| Component | wt. % |
|---|---|
| Ammonium thiosulfate | 58.92 |
| Water | 39.28 |
| Sodium benzoate | 1.000 |
| Benzotriazole | 0.400 |
| 2-mercaptobenzothiazole | 0.400 |
| | 100.00 |

EXAMPLE 9

This example illustrates a liquid concentrate of the present invention to be diluted approximately 4:1 (water:concentrate) by weight to form a wildland fire suppressant composition. Liquid guar gum concentrate may be added as needed for enhanced rheological properties.

| Component | wt. % |
|---|---|
| Ammonium thiosulfate | 56.04 |
| Water | 37.36 |
| Sodium benzoate | 1.000 |
| Benzotriazole | 0.400 |
| 2-mercaptobenzothiazole | 0.400 |
| Attapulgite Clay | 4.000 |
| Fading Pigment | 0.500 |
| Titanium dioxide | 0.300 |
| | 100.00 |

Having described the invention in such terms as to enable one skilled in the art to make and use it and, having identified the presently best mode of practicing it, I claim:

I claim:

1. In a fire suppressant composition, specially adapted for aerial application to suppress wildland fires, including a liquid carrier, a fire retardant component, in an amount of at least about 5% by weight of said composition, at least one functional additive component, selected from the group consisting of corrosion inhibitors, rheological modifying agents, suspending agents, antimicrobial agents, stabilizers and coloring agents, the improvements in said composition in which, (a) said fire retardant component includes ammonium thiosulfate in an amount of at least about 1.5% by weight of said composition, and (b) said fire suppressant composition is substantially free of nitrates, nitrites or zinc compounds.

2. The method for preparing a fire suppressant composition, specially adapted for aerial application to suppress wildland fires, comprising the steps of:

(a) forming an intermediate concentrate composition, suitable for transportation and storage, said concentrate composition comprising water and ammonium thiosulfate; and (b) diluting said concentrate with additional water to form said fire suppressant composition containing at least about 1.5% by weight of ammonium thiosulfate.

3. The method of suppressing wildland fires, comprising the step of aerially applying to wildland foliage a fire suppressing composition comprising water;

ammonium thiosulfate in an amount of at least about 1.5% by weight of said composition; and at least one functional additive component, selected from the group consisting of corrosion inhibitors, rheological modifying agents, suspending agents, antimicrobial agents, stabilizers and coloring agents.

* * * * *